Oct. 30, 1923.
G. W. PICKARD
ELECTROMAGNETIC COMPASS
Filed March 18, 1922
1,472,342
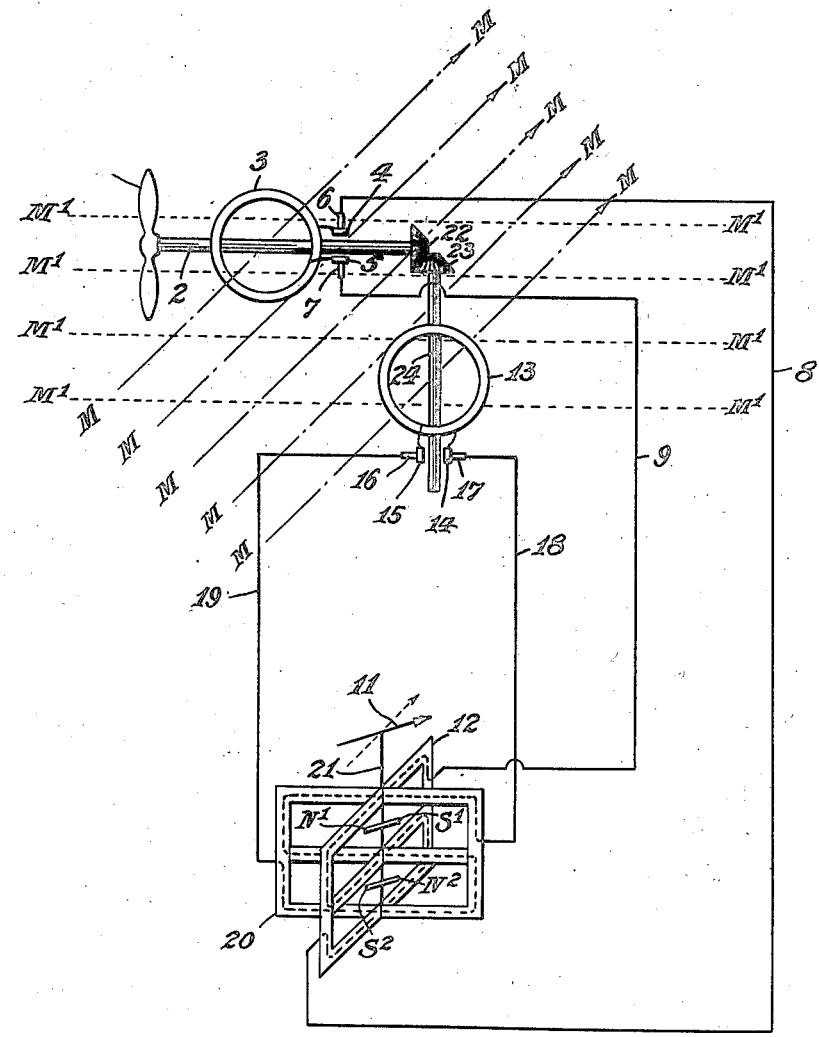
INVENTOR
Greenleaf Whittier Pickard
BY Philip Farnsworth
ATTORNEY Patented Oct. 30, 1923.

1,472,342

UNITED STATES PATENT OFFICE.

GREENLEAF WHITTIER PICKARD, OF NEWTON CENTER, MASSACHUSETTS, ASSIGNOR TO WIRELESS SPECIALTY APPARATUS COMPANY, OF BOSTON, MASSACHUSETTS, A CORPORATION OF NEW YORK.

ELECTROMAGNETIC COMPASS.

Application filed March 18, 1922. Serial No. 544,803.

*To all whom it may concern:*

Be it known that I, GREENLEAF WHITTIER PICKARD, a citizen of the United States of America, and a resident of Newton Center, State of Massachusetts, have invented a certain new and useful Electromagnetic Compass, the principles of which are set forth in the following specification and accompanying drawings, which disclose the form of the invention which I now consider to be the best of the various forms in which the principles of the invention may be embodied.

This invention relates to an electromagnetic compass which is reliably operative in the vicinity of mechanical vibration and in uses involving abrupt changes in direction such as the turning of an airplane, or other movements. This compass has a very powerful directive force capable of being relayed to a convenient observing point, thereby permitting location of the operating apparatus thereof at a point free from the disturbing effect of iron and steel masses. This compass also is operative independently of the motion in all directions of the craft carrying the compass, and will produce correct indications entirely independently of the speed of rotation of the operating apparatus and of the strength of the earth's field in the location thereof.

The object of the invention is to provide means for enabling navigators, particularly of air craft, and most particularly of airplanes, to inform themselves conveniently and accurately at all times of their directions of motion relative to the points of the compass.

The invention consists of the apparatus substantially as described herein and shown in the drawing, which is a diagrammatic illustration.

In general, the invention consists of a means whereby the earth's magnetic field produces a very powerful directive force at a convenient point which is sufficient to operate an indicating device located at any convenient observing point more or less distant from the operating apparatus, this operation being entirely independent of the speed of rotation of the operating apparatus and entirely independent of the strength of the earth's magnetic field at various locations of the airplane and the compass apparatus hereof relative to the earth.

The invention will be described with particular reference to its application to and use on airplanes, as being an important use wherein the life of the pilot may be involved and where lives have been lost in lack of this invention; although it is useful on dirigibles, air-ships, submarines, and the like.

At the upper part of the drawing is shown the operating apparatus 1, 7, 17, including the driver 1 and the two pick-up coils 3 and 13 at right angles to one another. This apparatus may be located at any desired or convenient part of the plane, as out on a wing tip or in the tail of the fuselage, well away from the magnetic influence of the steel masses of the plane-driving motor. This places the pick-up coils 3, 13 in an undisturbed part of the earth's field.

At the lower part of the drawing is shown the indicating apparatus 12, 20, 21, 11 (connected to operating apparatus 1, 7, 17 by electrical leads 8, 9 and 18, 19). This indicating apparatus may be located more or less distant from the operating apparatus, as in front of the pilot near the motor, and preferably in position so that the compass needle 11 will swing in a vertical circle like the other dashboard instruments in front of and facing the pilot's seat.

In the operating apparatus, the driver 1 for rotating coils 3, 13 preferably is a wooden air propeller as shown, which at all times during flying will be in motion irrespective of the motive power of the plane. By the use of such a wooden propeller as the compass-driver, the entire apparatus in the vicinity of coils 3, 13 may be made of non-magnetic material such as wood, impregnated fiber, glass, etc., so as to avoid all approximate magnetic fields other than that of the earth. (Of course, any other desired driving means may be used, such as a compressed-air engine.) In any case, shafts 2 and 24 on which coils 3 and 13 are mounted will be driven with considerable, although varying, angular velocity.

Pick-up coils 3 and 13, upon rotation by driver 1 (and gears 22, 23), will produce powerful directive forces which will be manifested by pointer 11 of the indicating apparatus located more or less distant on the plane, this according to the well-known phenomenon that a conductor moving in a magnetic field will have induced in it an E. M. F., the magnitude of which will depend on the product of the magnetic field strength and the rate at which the field is cut by the moving conductor. By the high rate of rotation of a suitable driver 1 and coils 3, 13, a very considerable E. M. F. will be generated even when the strength of the earth's field may be relatively weak at times of different locations of the plane relative to the earth.

The two pick-up coils 3, 13 of the operating apparatus are connected by the leads shown (8, 9 and 18, 19) to the respective coils 12, 20 of the more or less distant indicating apparatus located on the same plane.

Each of pick-up coils 3 and 13 may consist of a number of turns of wire (coils of several hundred turns being suitable), and each is fixed to its own shaft (2 and 24 respectively) and is rotated by and with it.

Pick-up coil 3 of the operating apparatus has it terminals connected to commutator segments 4, 5 against which bear contact brushes 6, 7 connected to leads 8, 9 to the indicating apparatus. Similarly, the other pick-up coil 13 of the operating apparatus has its terminals connected to commutator segments 14, 15 against which bear contact brushes 16, 17 connected to leads 18, 19 to the indicating apparatus.

If, then, shafts 2 and 24 of pick-up coils 3 and 13 on the plane be horizontal (for the moment) and if the earth's magnetic field be in the direction (relative) indicated by the dotted lines M' M', said operating coils or loops 3, 13 will be cut by varying fluxes and in them alternating currents will be set up. These currents will be rectified by the commutators 4, 5 and 14, 15, giving pulsating unidirectional currents in the circuits to the more or less distant indicating loops or coils.

In the indicating apparatus (lower part of drawing), the pointer 11 will move exactly as does the needle or pointer of an ordinary magnetic compass, but with far greater directive force and at a location at any desired distance from the operating apparatus, and with an accuracy which is independent of the strength of the earth's field and independent of the speed of the driver 1.

The indicating apparatus comprises the two fixed double coils 12 and 20 at right angles to one another (connected by the leads to the commutators of coils 3, 13), and two magnetized steel needles N' S' and S² N². These two coils 12, 20 are fixed in any convenient location and position on the craft, and arranged co-operatively as in intersecting planes as shown; and inside of them on support or suspension 21 are placed said two magnetized needles, and also the indicating pointer 11.

When the earth's magnetic field produces varying fluxes through coils 3, 13 of the operating apparatus, currents will be set up (via the connecting leads) in indicator coils 12 and 20, and the needle-system carrying point 11 will be moved by the effect of said currents relative to the airplane and in correspondence with the direction of the earth's field. That is, as the craft carrying this compass swings around, pointer 11 will do exactly what an ordinary compass needle does under its circumstances of use, i. e., maintain itself in a fixed position with respect to the earth's magnetic field, regardless of the movement or bearing of the craft, and independently of the speed of rotation of operating coils 3 and 13 and independently of the strength of the earth's field at any particular instant of flight. This is because any variation in the intensity of the earth's field will affect coils 3 and 13 equally, and the relative strengths of the two currents from said coils (on which the indication by pointer 11 depends) will remain the same.

The fixed positions of indicator coils 12, 20 is a matter of indifference, save that with reference to one another they are at right angles for best operation. If the indicating apparatus includes a fixed scale marked with the points of the compass (as it may), then movable pointer 11 will indicate the magnetic course of the craft regardless of the position of the indicating apparatus relative to the operating apparatus electrically connected therewith. The same will be true if (as in the ordinary ship's compass) movable pointer 11 be (as it may) in the form of a movable disk marked with the points of the compass and reading against a fixed point carried by stationary indicator coils 12 and 20.

Preferably indicator coils 12, 20 are so placed that movable pointer 11 or a movable card carried thereby will behave as if it were attached to an ordinary compass placed at this point,—this for the convenience of navigators accustomed to using the ordinary compass.

The movable system of the indicating apparatus (the magnetized needles, movable pointer 11 and their support 21), under the influence of the currents set up in fixed indicator coils 12, 20, either or both, always will take a position relative to said fixed coils so that the angle is that of the earth's field in respect to movable operating coils 3, 13, i. e., that of the earth's field relative to the bearing of the aircraft. The movable system should be without any control such as a spring, suspension, torsion, or magnetic control which would tend to keep it in any fixed position; that is to say, the only directive force acting upon this system should be the fields provided by the currents from the rotating coils 3, 13.

What is done, in effect, by this apparatus is to transfer in amplified form the earth's magnetic field existing in the space around the operating apparatus on the craft to the space enclosed by the fixed indicating coils 12, 20.

Inasmuch as fixed coils 12, 20 are connected by flexible leads to the operating apparatus, they may be located at any desired place and in any desired position on the plane, and preferably will be positioned so that the axis of the needle system will be horizontal (contra the diagrammatic drawing), indicator 11 swinging in a vertical plane like a clock hand or any other dashboard instrument. The pilot then has in front of him a vertical dial with markings such as N (north) at top, E (east) at three o'clock right, etc.; and indicator 11 swings over this dial like a clock hand. Then when indicator 11 may be directed at 9 o'clock, for example, the pilot will know that his craft is heading due west (magnetic).

As to details of construction and operation, the magnetized steel needles N' S' and $S^2 N^2$ are oppositely poled with respect to one another as indicated, so that they form an astatic combination which is not influenced by external fields. Also, the needles N' S' and $S^2 N^2$ preferably are so pivoted or suspended as to be free from any directive force other than the current in indicator coils 12, 20.

The direction of the currents in the upper halves of double indicator coils 12, 20 (that is, the parts around needle N' S') is in opposition to the direction of the currents in the other parts of the same coils, i. e., around needle $S^2 N^2$ (see indication by dotted lines on the coils, of the currents following the wire winding of these double coils). The currents in both said parts of the coils act in the same direction on the two magnetized needles because the latter are oppositely poled, so that the magnetic indicator system is rotated by both said needles. Thus the movable indicator system is rotated by the action of both movable coils 3, 13 of the operating apparatus, although not influenced by any magnetic field which would act on both magnetized needles in the same direction.

As to operation, consider use on a plane in motion.

Assume an instant of time when in a certain direction of motion of the plane the operating coils 3, 13 are cut by the earth's field at 45° (see broken lines M—M). Then equal currents will be set up in the two circuits, equal forces will act on the needle-system and the latter with indicator 11 will take a position halfway between the two fixed indicator coils 12, 20, as shown by the full-line position of indicator 11. (This shows that at that instant the earth's field is at a 45° angle with the shafts 2, 24 of the compass-operating apparatus.)

Again, assume the plane with the compass-operating apparatus thereon to be swung by the pilot so that the earth's field takes the (relative) direction M'—M'. Then rotating coil 3 has no varying flux, and therefore fixed indicator coil 12 will have no current in it. But rotating coil 13 is being cut by varying flux, with resulting current in indicator coil 20. Hence in this case the movable needle-system is acted on only by coil 20, and it moves to a position at right angles to said coil 20, as shown by the dotted-line position of indicator 11.

At any other position of the compass-operating apparatus relative to the earth's field, currents of varying amounts and directions will be set up in the two operating coils and therefore in the two indicating coils 12, 20, so that the movable indicating system always will take a position corresponding with the angle of coils 3, 13 relative to the earth's field. That is, indicator 11 always will move relative to coils 12, 20 (which are in fixed positions on the craft) so that however the craft may be turned, the indicator 11 will be moved instantly to a position which is fixed relative to the earth's field, exactly as in the case of the needle of an ordinary magnetic compass.

Summarizing, the two rotating operating coils 3, 13 on shafts at right angles to one another, producing currents in the two instrument-coils 12, 20 in fixed positions on the craft but located at right angles to one another, will produce a deflection of the indicator 11 to a correct reading, entirely independent of the speed of rotation of driver 1 and entirely independent of the strength of the earth's field at any particular position of the plane in space. This is the most valuable characteristic of the invention and the thing which makes it practical for such important service as air navigation. For the earth's magnetic field may vary considerably even at points distant but a few miles from one another. And it is very difficult, if not impossible, to arrange a driver for the compass-operating apparatus which will maintain even an approximately constant speed. This invention provides true readings independent of variation of speed of air-propeller or other driver 1, and independent of variations of strength of the earth's field at different points of the travel of the aircraft.

The apparatus hereof is designed and adapted for use particularly on aircraft, in lieu of the ordinary magnetic compass, for it provides not only a correct reading at all times like an ordinary magnetic compass on shipboard, but responds instantly to rapid changes in the directions of movement of a plane. For such use, the ordinary magnetic compass is impracticable, first, because its directive force is small (requiring very delicate pivoting to avoid error from friction and making it very difficult if not impossible to place it in a convenient observing position, as vertical), second, because it is disturbed by mechanical vibration, and third, because of the disturbing effect on it of the iron and steel masses of the plane-driving motor near which the pilot sits, which make it desirable to place it in another location, where observation by the pilot is far less convenient.

My invention not only provides a very strong directive force resulting in positive and instantaneous reaction to true indicator-reading, but permits location of the operating and indicating parts of the apparatus at two different best parts of the plane.

I am aware that previously it has been proposed to provide a compass having a rotating coil and leads therefrom to an indicating instrument for small electric currents, such as a galvanometer or the like (as in U. S. Patent 1,047,157). Such a compass is useful to a degree in navigation, particularly on water craft. In such case, the apparatus can be placed so that when the craft is on the desired course, the pointer of the indicating instrument will show a midpoint or zero deflection; and any divergence of the craft from such course will result in a deflection of the pointer from right to left of zero. When the course thereupon is corrected by the helmsman, the pointer will indicate that fact by a return to the midpoint or zero position. My apparatus, however, is an improvement in that it gives results just like those of an ordinary magnetic compass on water craft, i. e., under conditions of service such as air-navigation where the ordinary magnetic compass is quite inadequate.

The best proportions of coils, the optimum speed of rotation, the form of suspension or pivots for the indicator 11. etc., may be varied at the will of the designer of a given embodiment. Also the invention is not intended to be limited in any wise short of its patentable novelty under the doctrine of equivalents of the subject-matter defined in the claims.

I claim:—

1. A magnetic compass which comprises operating apparatus and indicating apparatus, the operating apparatus consisting of two rotatably mounted coils located to have their axes at an angle to one another, and the indicating apparatus consisting of two loops located at an angle to one another, connected in circuit respectively with said operating coils and provided with a magnetic indicator system mounted to be movable relative to said loops and to be subjected to their influence; said magnetic system comprising two magnetized members, and each of said loops comprising a double loop, said magnetic system and loops being constructed and relatively arranged so that any currents in both parts of either loop act to swing both said magnetized members in the same direction.

2. A magnetic compass comprising operating apparatus consisting of two coils mounted for rotation about axes at an angle to one another; indicating apparatus consisting of two loops located at an angle to one another and provided with a magnetic indicating system mounted to be movable relative to said loops and to be subjective to their joint action; and commutators by way of which the operating coils are connected to the respective fixed coils.

3. A magnetic compass which comprises operating apparatus and indicating apparatus electriclly connected with one another, the operating apparatus consisting of two rotatably mounted coils located to have their axes at an angle to one another, each coil being provided with a commutator in the connection between it and the indicating apparatus; and the indicating apparatus consisting of two loops located at an angle to one another, each connected to one of said commutators, and provided with a magnetic indicating system mounted to be movable relative to said loops and to be subjected to their influence; each loop comprising two parts wound oppositely and the magnetic system including two oppositely poled members, one located to be swung by the one part of each loop and the two located to be swung in the same direction by the other part of each loop.

4. A magnetic compass comprising a pair of rotatable coils mounted with their axes of rotation at an angle to one another, a pair of loops electrically connected respectively to said coils and also mounted at an angle to one another; rectifying means connected between the respective coils and loops; and a magnetic indicating system arranged to be subjected to the action of said loops.

5. A magnetic compass comprising two rotatable coils having their axes of rotation substantially at right angles to one another; two stationary loops arranged in intersecting planes substantially at right angles to one another and electrically connected respectively to said coils; rectifying devices in said respective connections; and a magnetic indicating system mounted to be movable relative to said loops and to be subjected to the influence of each of them.

GREENLEAF WHITTIER PICKARD.